United States Patent
Maurice et al.

(10) Patent No.: US 6,488,133 B1
(45) Date of Patent: Dec. 3, 2002

(54) CLUTCH SYSTEM AND METHOD

(75) Inventors: Kevin L. Maurice, Bristol; Steven E. Nyquist, Simsbury; Kenneth G. Bosley, Torrington; Jon L. Masthay, Plantsville, all of CT (US)

(73) Assignee: Inertia Dynamics, Inc., Collinsville, CT (US)

( * ) Notice: Subject to any disclaimer, the term of this patent is extended or adjusted under 35 U.S.C. 154(b) by 0 days.

(21) Appl. No.: 09/528,690

(22) Filed: Mar. 20, 2000

Related U.S. Application Data

(63) Continuation-in-part of application No. 08/937,816, filed on Sep. 29, 1997, now Pat. No. 6,047,805.

(51) Int. Cl.[7] .......................... F16D 67/06; F16D 27/105
(52) U.S. Cl. .................. 192/16; 192/12 BA; 192/17 R; 192/84.81
(58) Field of Search ............................ 192/84.81, 84.8, 192/15, 16, 17 R, 17 C, 12 BA, 12 D, 36, 81 C, 84.7, 107 M

(56) References Cited

U.S. PATENT DOCUMENTS

| | | |
|---|---|---|
| 3,095,071 A | 6/1963 | Mason |
| 3,149,705 A | 9/1964 | Shoquist |
| 3,149,706 A | 9/1964 | Mason et al. |
| 3,171,523 A | 3/1965 | Shoquist |
| 3,177,996 A | 4/1965 | Bates |
| 3,642,106 A | 2/1972 | Baer |
| 3,685,622 A | 8/1972 | Baer et al. |
| 4,201,281 A * | 5/1980 | MacDonald .......... 192/81 C X |
| 4,271,948 A | 6/1981 | Yew |
| 4,290,393 A * | 9/1981 | Hart et al. ................ 123/41.12 |
| 4,863,528 A * | 9/1989 | Brown et al. ................ 148/695 |
| 4,997,067 A * | 3/1991 | Watts ................ 192/107 M X |
| 5,687,822 A * | 11/1997 | Arai ......................... 192/84.81 |
| 5,967,274 A | 10/1999 | Leone et al. |
| 6,047,805 A | 4/2000 | Nyquist |

FOREIGN PATENT DOCUMENTS

| | | | |
|---|---|---|---|
| JP | 58-131433 | * 8/1983 | .............. 192/84.81 |

* cited by examiner

Primary Examiner—Rodney H Bonck
(74) Attorney, Agent, or Firm—Cummings & Lockwood; George N. Chaclas

(57) ABSTRACT

A soft action clutch uses a helical spring attached to a pulley at one end and free at the other end. In a relaxed state, preferably, the helical spring presses outwardly pushing a brake pad assembly against a fixed outer field cup braking the pulley. To serve as a clutch, a rotor has a pole face to magnetically draw the helical spring towards it. The resulting friction between the rotor and helical spring causes the spring to wrap down on a spring loaded friction disk. The wrap down compresses the friction disk radially, creating two frictional links from the friction disk to the rotor and the pulley, respectively.

42 Claims, 11 Drawing Sheets

CLUTCH SYSTEM AND METHOD

CROSS-REFERENCE TO A RELATED APPLICATION

This application is a continuation-in-part of commonly assigned U.S. application Ser. No. 08/937,816 to Nyquist et al. filed on Sep. 29, 1997 now issued U.S. Pat. No. 6,047,805, the disclosure of which is incorporated herein by reference.

BACKGROUND OF THE INVENTION

1. Field of the Invention

The subject invention relates to systems for clutches and brakes, and more particularly to an improved clutch and brake assembly. Use of self-energizing clutches has been widely used and well understood in the art.

2. Background of the Related Art

Clutches are used generally to control the transmission of torque between rotating machine elements. Positive clutches, when engaged, lock the elements together to rotate as one. Such clutches may be "self-energizing" to the extent that the force of engagement increases as the torque between the shafts increases.

It is known to those skilled in the art to produce electrical, self-energizing, positive clutches utilizing a helical spring attached at one end to one rotating machine element, and electromagnetically attracted to the second rotating machine element by an electromagnetic coil when the clutch is to be activated. Twisting, of the helical spring caused by relative motion of the two rotating machine elements causes the spring to tighten about an annular wedge of frictional material to press it against opposed faces of the two machine elements bringing them into frictional linking. The helical spring and the wedge shape of the frictional material define a mechanical advantage that may allow a relatively low force of attraction between the electromagnet and the helical band to nevertheless provide a high torque coupling of the two machine elements in a desirable manner. One example of such a clutch is found in U.S. Pat. No. 3,149,706, and hereby incorporated by reference.

Often it is desirable, when the clutch is disengaged, to lock the driven machine element in place to prevent freewheeling. For this purpose, an electric brake may be attached to the driven machine element. However, there are problems associated with this solution. For example, circuitry must be provided to energize the brake when the electric clutch is de-energized. Actuation of the brake while the clutch is engaged causes excessive wear. Further, the use of an electric brake increases the cost, size and complexity of the total drive mechanism. Therefore, there is a need for an improved clutch and brake assembly which has a minimum of components, high life cycle and aids in assuring adequate safety.

SUMMARY OF THE INVENTION

The preferred embodiment provides a combination electrical clutch and brake sharing many components to reduce bulk and expense. Generally, the invention modifies the helical spring clutch mechanism so that when the spring is untorsioned, it expands radially outward against a brake sleeve restraining the driven machine element from free rotation. When under torsion, the helical band compresses a friction material to interconnect the driven machine element with the driving machine element while simultaneously releasing itself from the brake sleeve.

Specifically, the preferred embodiment provides an electric clutch and brake having a helical spring coaxial with an axis of rotation, the helical spring having a first and second end. A first machine element rotatable about the axis of rotation is attached to a first end of the helical spring. The first machine element has the first friction surface disposed on a first radial side of the helical spring. A second machine element rotatable about the axis of rotation has a second friction surface disposed on the first radial side of the helical spring and further has a pole face adjacent to the second end of the helical spring. An electromagnetic coil is positioned adjacent to the pole face so as to pull the second end of the helical spring into contact with the pole face when electrical current is passed through the electromagnetic coil. A retention plate having a third frictional surface is disposed on a second radial side of the helical spring opposite the first radial side of the helical spring. The helical spring causes frictional linking between the third frictional surface and the first machine element in a relaxed state when no current flows through the electromagnetic coil. The helical spring causes a frictional linking between the first and second frictional surfaces in a torsion state when current flows through the electromagnet coil.

Thus, it is one object to provide a simple combination clutch and brake mechanism. The same helical spring providing a frictional linking between the first and second machine elements provides a braking action to the first machine element when engaging this retention plate.

It is another object to provide a combination clutch and brake assembly in which clutching and braking action are mutually exclusive, reducing the possibility of unintentional clutch or brake wear. Because this same helical spring in alternate states provides both braking and clutching, the clutch and brake may not be simultaneously activated.

The first radial side of the helical spring may be the inside of the helical spring and the second radial side may be the outside of the helical spring.

It is another object, therefore, to provide an extremely compact brake clutch assembly. By placing the frictional surfaces in opposition radially, the total shaft length of the clutch brake assembly need not be increased over what would be required for the clutch alone.

The retention plate may be an annular cylinder coaxial with the axis of rotation having a radially inner surface adjacent to the outer radial surface of the helical spring. The frictional linking between the third frictional surface and the first machine element may be caused by a contacting of the outer radial surface of the helical spring with the inner surface of the annular cylinder.

Thus, it is another object to provide an extremely simple clutch and brake mechanism. In a preferred embodiment, by allowing the helical spring to directly contact the outer annular surface of the retention plate, the brake may be implemented with essentially no additional components over that required for the clutch alone.

One embodiment includes a device which comprises a cushioned clutch by reducing the friction. The soft action clutch can function integral with the brake assembly by sharing components. Another embodiment provides a brake pad assembly to more effectively brake a pulley. Further, an embodiment provides friction material between a clutch spring and a pole face to more effectively engage the two surfaces. Still further, an embodiment includes a spring-loaded bumper block to bias a friction disk to prevent premature wear and provide soft engagement. Another aspect of the invention is to provide a clutch which engages free of interference and still provides a reliable brake.

These and other unique features of the system disclosed herein will become more readily apparent from the following description, the accompanying drawings and the appended claims.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF THE PREFERRED EMBODIMENT

Figure 1:
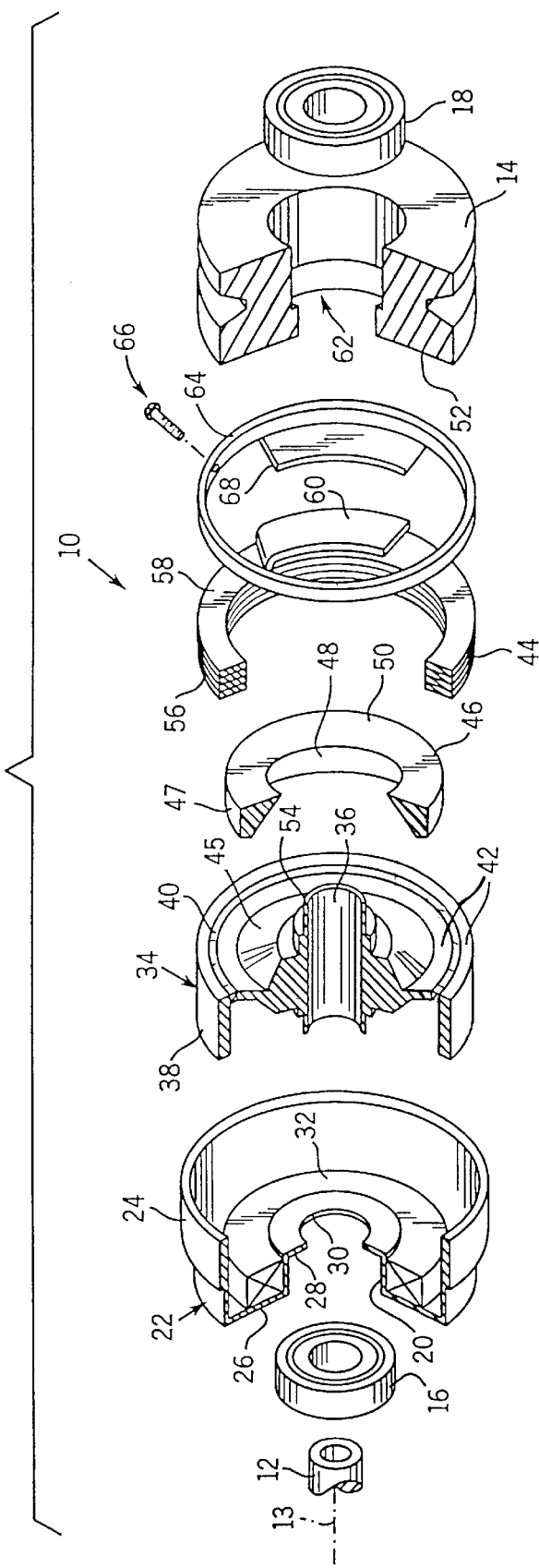
FIG. 1 is an exploded perspective view in quarter cross-section showing the components of the clutch and brake assembly of a preferred embodiment.

Reference is now made to the accompanying Figures for the purpose of describing, in detail, the preferred embodiments of the present invention. The advantages and other features of the system disclosed herein, will become more readily apparent to those having ordinary skill in the art from the following detailed description of certain preferred embodiments of the present invention and wherein like reference numerals identify similar structural elements. However, the Figures and accompanying detailed description are provided solely as examples of the invention and are not intended to limit the scope of the claims appended hereto.

As will become more apparent from the following description, the present invention provides a novel and unique system in which a minimum of components provide a long lasting clutch as well as a brake assembly. In so doing, the system serves to eliminate the large size, unnecessary cost and complexity of a clutch and brake assembly while providing a cushioned and long lasting performance.

Figure 2:
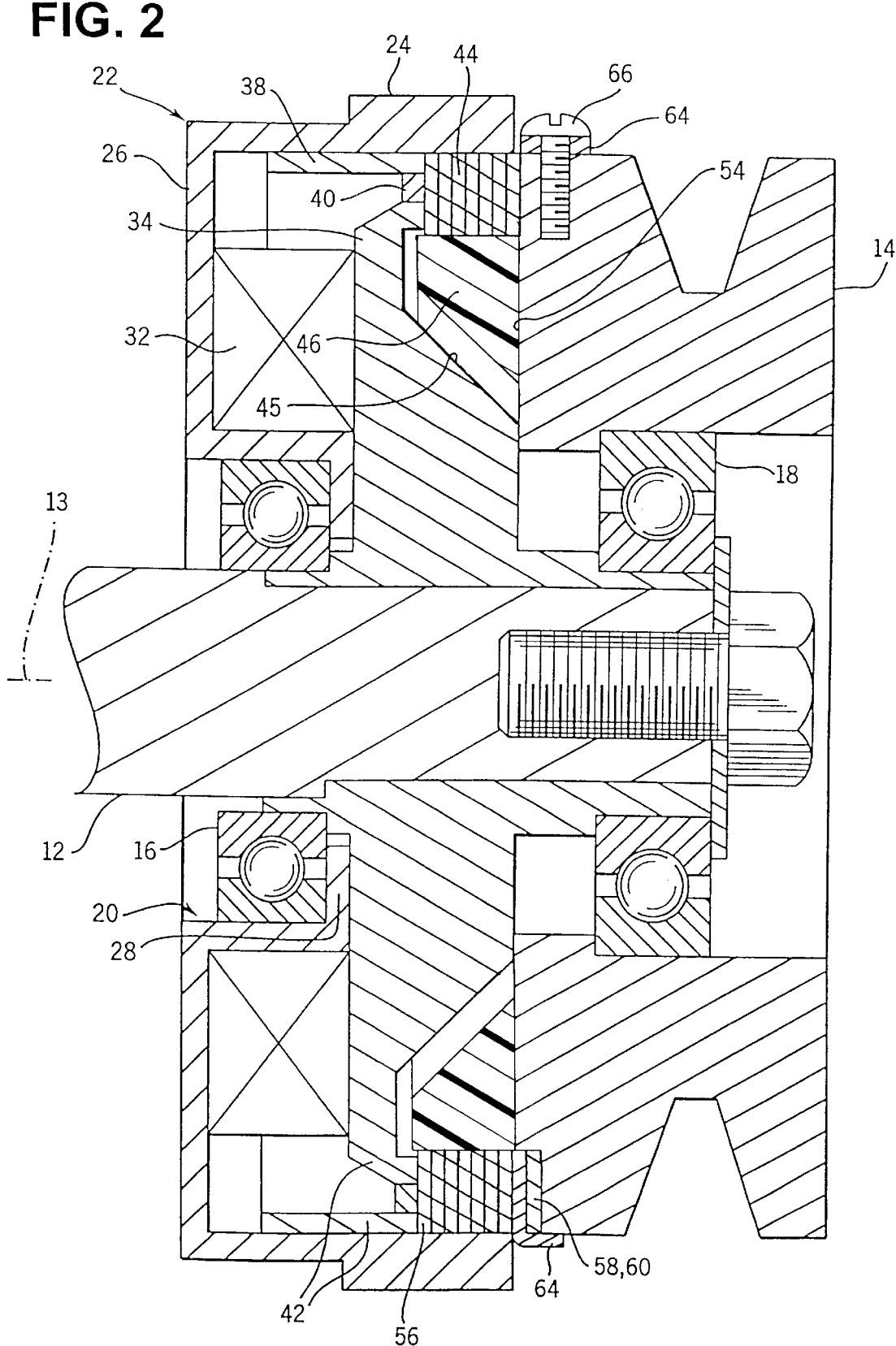
FIG. 2 is an elevational cross-section of the clutch and brake assembly of FIG. 1 in brake mode with the helical spring in the relaxed state.

Referring now to FIG. 1 and FIG. 2, the clutch and brake assembly 10 of the present invention when engaged, connects a drive shaft 12 extending along an axis of rotation 13 to a pulley 14. The pulley 14 and drive shaft 12 are independently supported by bearings 16 and 18.

A generally cylindrical field cup 22 opening toward a front of the clutch and brake assembly 10 is constructed of steel or other ferromagnetic material and has a tubular outer wall 24 coaxial with axis 13. The field cup 22 is partially closed at a rear end by a base plate 26. Centered in the base plate 26 is a rearward opening recess 20 which supports the outer surface of bearing 16. A floor 28 of recess 20 has an aperture 30 sized to receive the shaft 12 passing through the bearing 16 with the bearing 16 restrained from further frontward axial motion by the floor 28 surrounding aperture 30. Field cup 22 includes an anti-rotation tab (not shown) for mounting it in a stationary position with respect to shafts 12 and pulley 14.

Positioned within the field cup 22 against the base plate 26, coaxial with axis 13 and around the recess 20, is an electromagnet coil 32. The electromagnet coil 32 has leads (not shown) so that current may be passed through electromagnet coil 32 to create a magnetic field extending along axis 13 as will be described.

Fitting within the tubular outer wall 24 of field cup 22 is a generally disk-shaped rotor 34 having a keyed axial bore 36 receiving shaft 12 to turn with shaft 12. The outside diameter of rotor 34 provides an annular cylindrical wall 38 adjacent to the inner surface of tubular outer wall 24 of the field cup 22. A front edge of the annular cylindrical wall 38 is attached to the hub of the rotor 34 through a ring shaped copper swedge 40. The copper swedge 40 breaks the magnetic path for flux passing through the other parts of the rotor 34 which are constructed of a ferromagnetic material to preferentially conduct magnetic field lines therethrough.

The front surface of the ferromagnetic portions of the rotor 34 immediately inside and outside of the copper swedge 40 form a pole face 42 against which an adjacent winding of a coaxial helical spring 44 may be drawn when the electromagnet coil 32 is actuated. This pole face 42 is generally perpendicular to the axis 13. Radially inside the pole face 42 is a sloping friction surface 45 forming a truncated cone extending forward over shaft 12.

Pulley 14 is assembled to the brake clutch 10 by means of bearing 18 fitting over a front protruding support surface 54 of the rotor 34. The inside of the bearing 18 is supported on the support surface 54 and the outside of the bearing fits within a bore in the pulley 14.

A friction disk 46 approximately in equal diameter to the friction surface 45 has one diagonal face 48 generally conforming to the friction surface 45 when the disk is arranged coaxially about the axis 13 between the rotor 34 and the pulley 14. The friction disk 46 is a single-piece ring split with a radial gap at one point and composed of any well known brake-lining material. The friction disk 46 includes a central aperture to allow free rotation of the shaft 12 and rotor 34 and friction surface 45 within the friction disk 46 absent any compression of the friction disk 46 against friction surface 45.

A radial face 50 of friction surface 45, opposed generally to diagonal face 48 of the friction disk 46 but extending perpendicularly to the axis 13, abuts a similarly extending friction surface 52 of pulley 14. A pressing radially inward of the friction disk 46 thus presses faces 48 and 50 against friction surfaces 45 and 52 establishing a frictional linking between the rotor 34 and the pulley 14.

Positioned coaxially about the friction disk 46 on its radial outward surface is a helical spring 44 having individual coils with a generally rectangular cross-section. The helical spring 44 has an inner coil 56 lying generally within a plane perpendicular to axis 13 and adjacent to pole face 42 of rotor 34. The helical spring 44 also has an outer coil 58 having a protruding end 60 received within a recess 62 in pulley 14 and held within that recess by a retaining ring 64.

Retaining ring 64 is a cylindrical annular ring fitting over a portion of the outside diameter of the pulley 14 and secured with a machine screw 66 and an inward extending ear 68 sandwiching the protruding end 60 between the ear 68 and the recess 62 of the pulley 14. Therefore, retaining ring 64 attaches one end of the helical spring 44 to pulley 14.

Friction disk 46 has a radially outward edge 47 aligned with the axis 13 opposing and abutting the radial inner edge of the helical spring 44. A decrease in the effective diameter of the helical spring 44 (as may be caused by torsion of the helical spring 44) presses the friction disk 46 radially inward to wedge between friction surface 45 of rotor 34 and friction surface 52 of pulley 14 and frictionally locks them together.

Figure 3A:
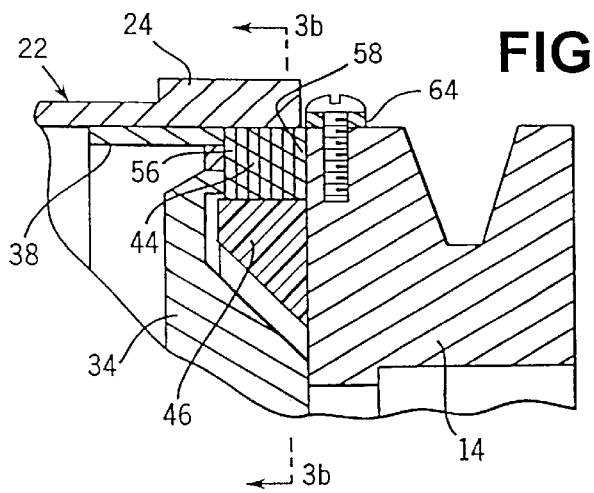
FIG. 3(a) is a fragmentary view of FIG. 2 with the clutch and brake assembly of FIG. 1 in brake mode.
Figure 3B:
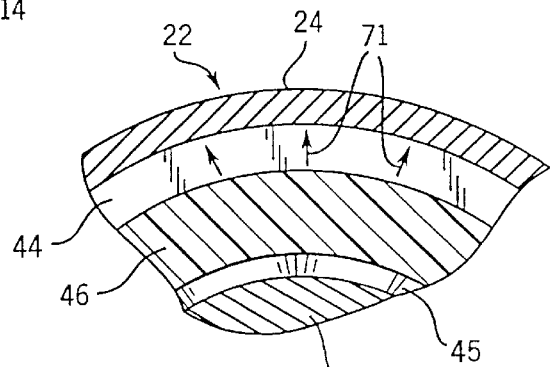
FIG. 3(b) is a cross-sectional view taken along line 3(b) of FIG. 3(a)

Referring now also to FIGS. 3(a) and 3(b), generally the helical spring 44 is wound so that when it is in a relaxed mode (without appreciable torsion or extension), it has an outer diameter slightly larger than the inner diameter of the tubular outer wall 24 of the field cup 22. Thus, the outer edge of the helical spring 44 presses radially outward against the inner edge of the tubular outer wall 24 as shown by arrows 71 effectively locking the pulley 14 which is attached to the helical spring 44 in a stationary position against the field cup 22. The field cup 22 acts as a retention plate preventing motion of the pulley 14 with respect to the field cup 22. Frictional forces between the helical spring 44 and the tubular outer wall 24 that would cause an unwinding of the helical spring 44 with motion of the pulley 14 increase this outward pressing.

Figure 4A:
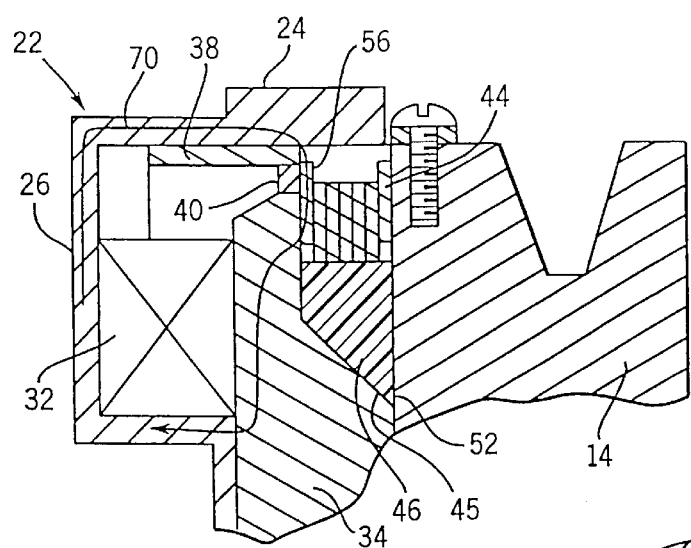
FIG. 4(a) is a figure similar to that of FIG. 3(a) showing the clutch and brake assembly of FIG. 1 in clutch mode.
Figure 4B:
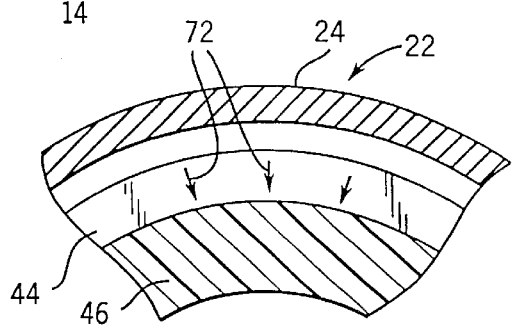
FIG. 4(b) is a view similar to that of FIG. 3(b)

Referring now to FIGS. 4(a) and 4(b), when electromagnet coil 32 is energized, magnetic flux 70 passes upward through base plate 26 and along tubular outer wall 24 of the field cup 22 passing into annular cylindrical wall 38 of the rotor 34 and then through the inner coil 56 of the helical spring 44 which offers a lower resistance path than the copper swedge 40. The flux line then passes backward into the body of rotor 34 and then into the recess forming wall of the field cup 22 to complete its circuit.

The attraction of inner coil 56 of helical spring 44 causes a frictional linking between the inner coil 56 and the rotor 34. The winding of the helical spring and the loading of the shaft 12 and pulley 14 is such as to tighten the windings of the helical spring 44 causing its inner and outer diameters to contract releasing the helical spring 44 from frictional linking with the tubular outer wall 24 and causing its inner diameter to compress friction disk 46 downward against friction surfaces 45 of rotor 34 and 52 of pulley 14. This frictional linking causes pulley 14 to turn with rotor 34 and thus with shaft 12 (not shown) in FIG. 4(a). The compressive force exerted by the helical spring 44 on the friction disk 46 is illustrated by arrows 72.

In another embodiment, a friction material disposed on the field cup 22 facilitates linking of the outer diameter of the helical spring 44 and field cup 22. Further, it will be understood that the inward and outward direction of the helical spring may be reversed with the helical spring having a bias inward to normally compress friction disk 46 inward with the action of the rotor 34 on inner coil 56 unwinding the helical spring 44 to cause frictional linking between the spring and the field cup 22.

During testing of the embodiment of FIGS. 1–4, several performance improvements were discovered. Friction disk wear and stress on the helical spring limited assembly life. Additionally, force created by the braking action and the metal to metal contact of the helical spring against the tubular outer wall created heat and wear. Thus, further development resulted in the following embodiments.

Figure 5A:
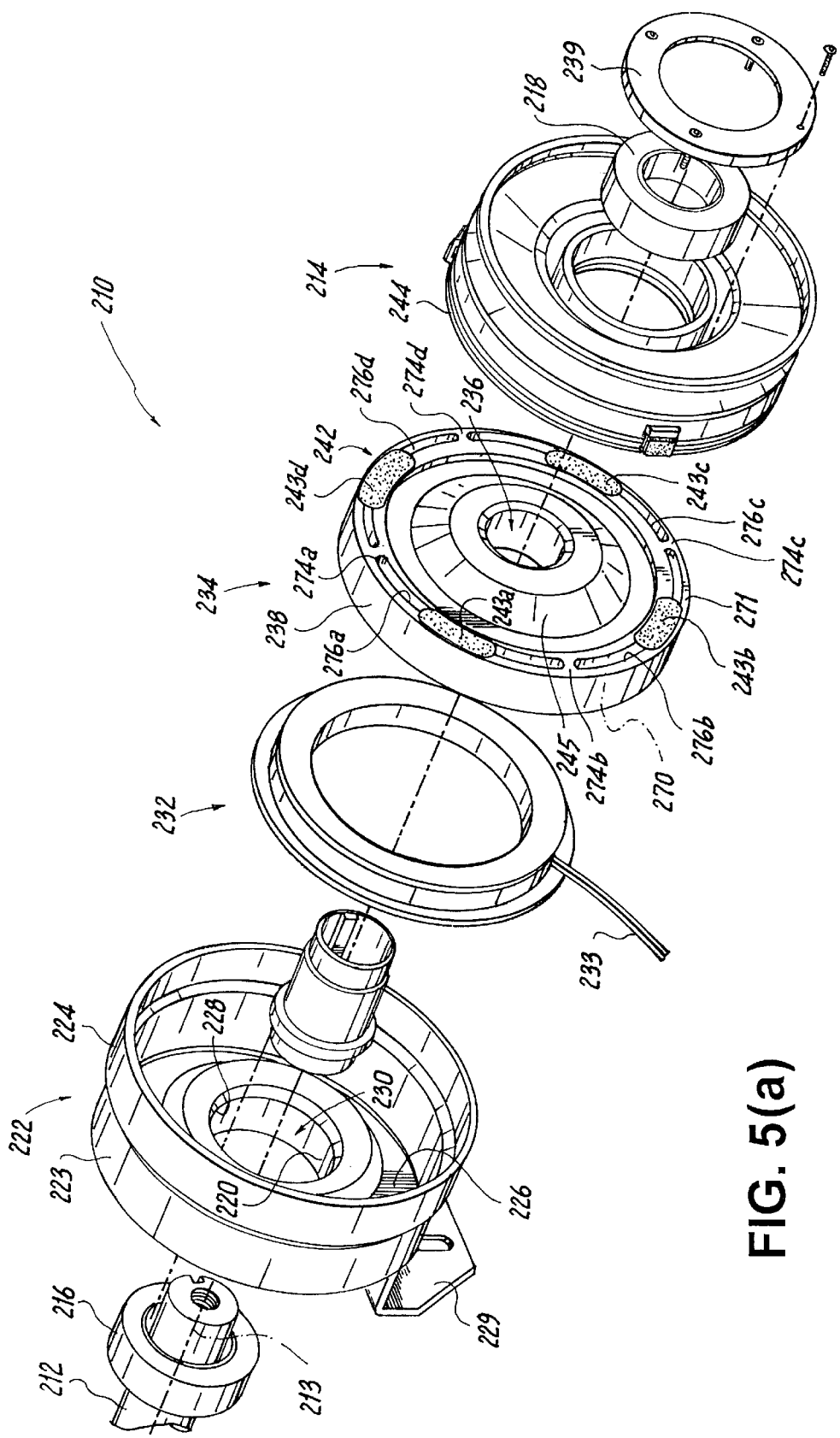
FIG. 5(a) is an exploded perspective view showing components of another embodiment of a clutch assembly.
Figure 5B:
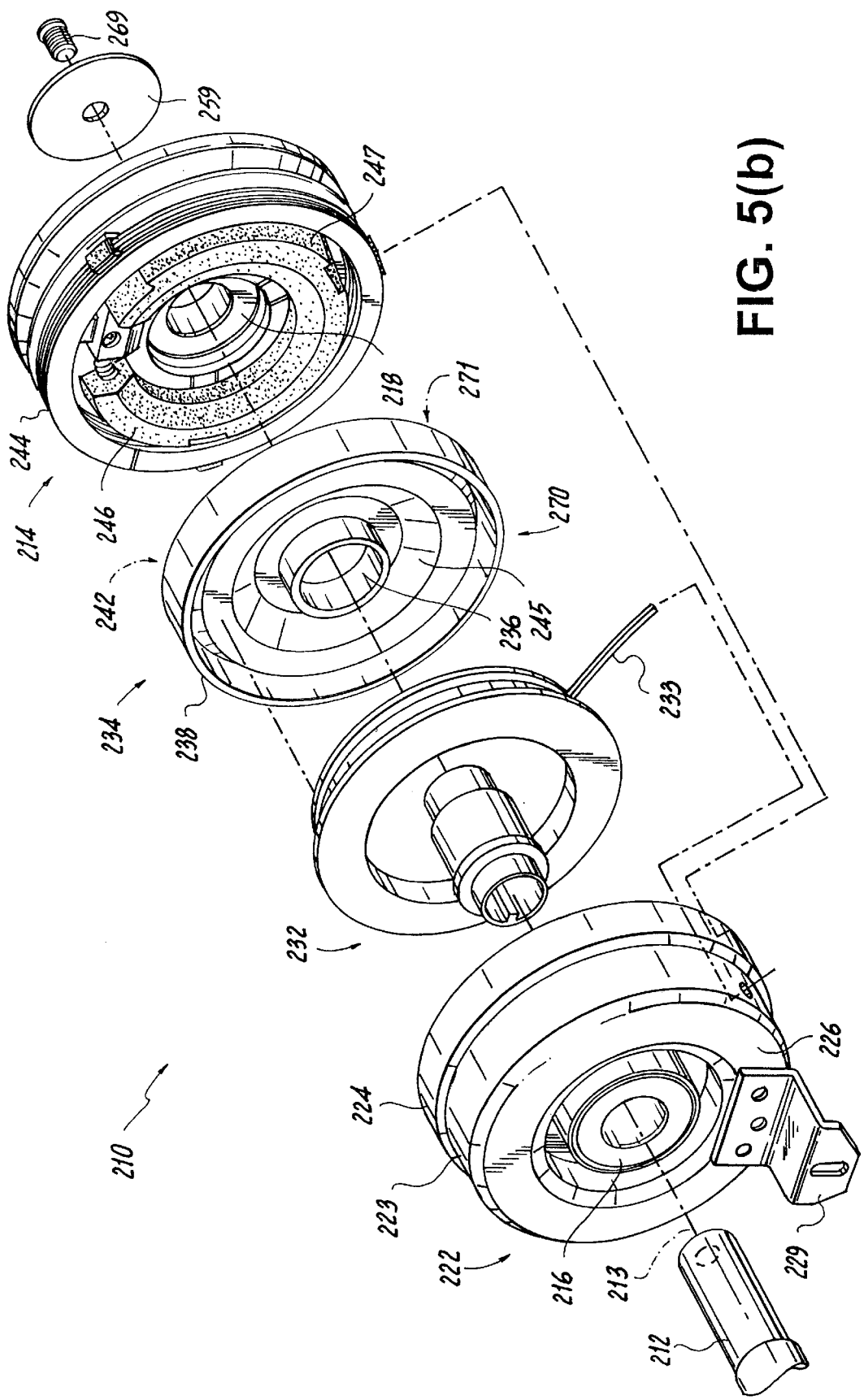
FIG. 5(b) is an exploded perspective view showing components of another embodiment of a clutch assembly.
Figure 5C:
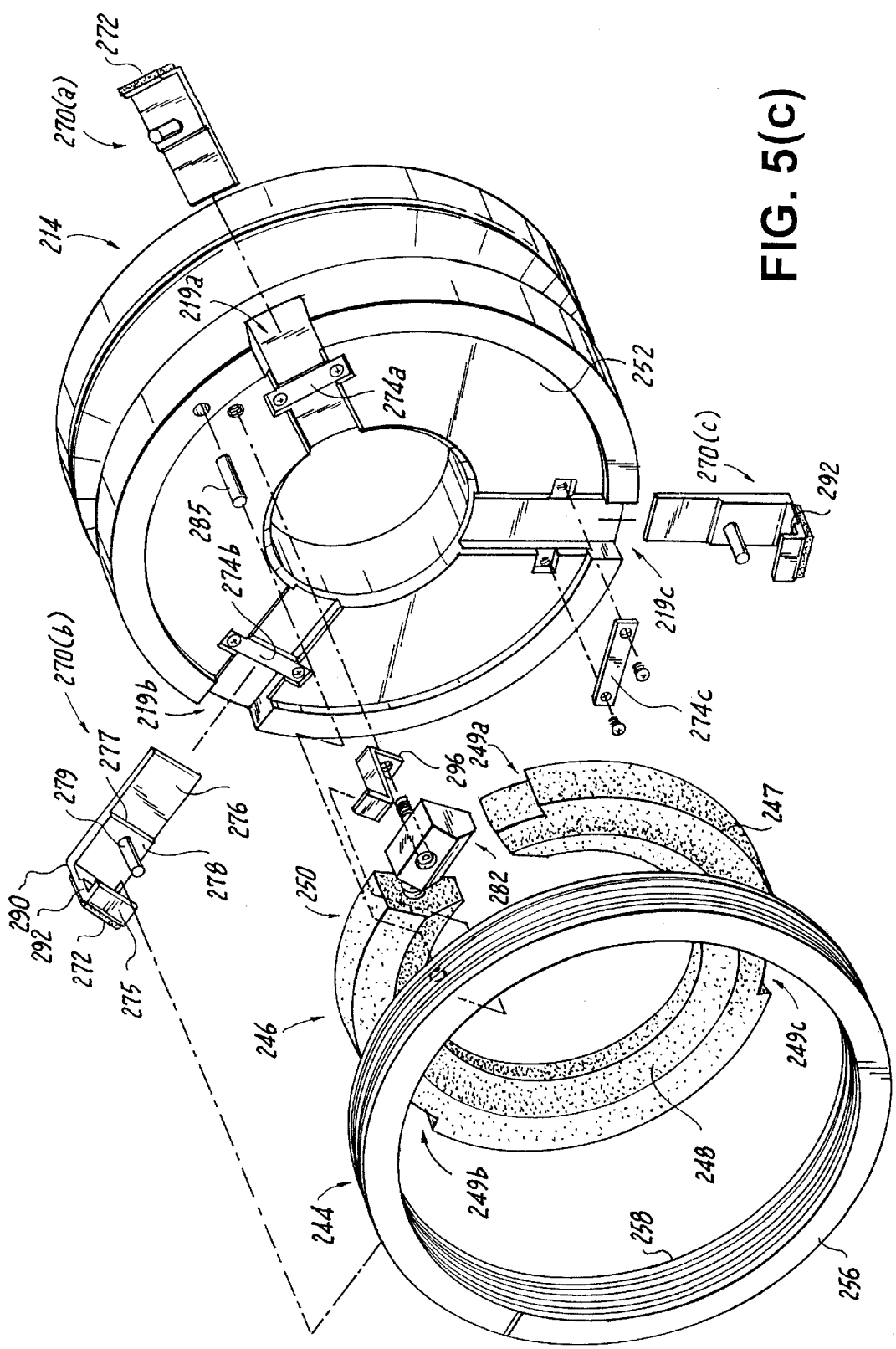
FIG. 5(c) is an exploded perspective view showing components of a pulley assembly of an embodiment.

Now referring to FIGS. 5(a)–(c), exploded perspective views showing the components of clutch assembly 210 of another preferred embodiment is illustrated. Clutch assembly 210 of the present disclosure, when engaged, connects a drive shaft 212 extending along an axis of rotation 213 to a pulley 214. The rotor 234 and pulley 214 are independently supported by bearings 216 and 218, respectively.

A generally cylindrical field cup 222 opening toward a front of the clutch assembly 210 is constructed of steel or other ferromagnetic material and has a tubular outer wall coaxial with axis 213. The field cup 222 is partially closed at a rear end by a base plate 226. Centered in the base plate 226 is a rearward opening recess 220 which supports the outer surface of bearing 216. A floor 228 of recess 220 has an aperture 230 sized to receive the shaft 212 passing through the bearing 216 with the bearing 216 restrained from further frontward axial motion by the floor 228 surrounding aperture 230. An anti-rotation tab 229 mounts field cup 222 in a stationary position with respect to shafts 212 and pulley 214. When assembled, the clutch assembly 210 is entirely contained with the field cup 222 except for a portion of the pulley 214. As a result, contamination of the present invention is minimized even under undesirably dirty operating conditions. Furthermore, safety is enhanced because most of the moving parts are inaccessible.

Still referring to FIGS. 5(a)–(c), positioned within the field cup 222 against the base plate 226, coaxial with axis 213 and around the recess 220, is an electromagnet coil 232. The electromagnet coil 232 has leads 233 so that current may be passed through electromagnet coil 232 to create a magnetic field. The tubular outer wall of field cup 222 has a stepped geometry which includes a portion 223 with a smaller radius than portion 224 of field cup 222. Fitting within portion 223 is a generally disk-shaped rotor 234 having a keyed axial bore 236 receiving shaft 212 to turn with shaft 212. The outside diameter of rotor 234 provides an annular cylindrical wall 238 adjacent to the inner surface of portion 223 of the tubular outer wall of the field cup 222. The front surface of the ferromagnetic portions of the rotor 234 form a pole face 242 having an inner pole 270 and an outer pole 271. The pole face 242 is generally perpendicular to the axis 213. Radial slots 276(a)–(d) stamped through disk-shaped rotor 234 separate inner pole 270 and outer pole 271. Webs 274(a)–(d) maintain structural integrity while at the same only supporting insubstantial flux leakage. Pole face 242 has four elongated pads 243(a)–(d) comprised of friction material. In an alternative embodiment, the friction material is in an annular ring. Preferably, elongated pads 243(a)–(d) are flush with pole face 242. In another embodiment, elongated pads 243(a)–(d) may be several thousandths of an inch recessed into pole face 242 or raised several thousandths above pole face 242. It is envisioned that the friction material, which links the helical spring 244 and pole face 242, could be provided only on helical spring 244 or, in contrast, on pole face 242 and helical spring 244.

When electromagnetic coil 232 is actuated, the adjacent winding of coaxial helical spring 244 is drawn against pole face 242. As a result of elongated pads 243(a)–(d) on pole face 242, pole face 242 more effectively engages helical spring 244, which increases clutch life. Further, the friction material provides a lubricated engagement as opposed to metal on metal and the clutch action is softened in a desirable manner. Radially inside pole face 242 is a sloping friction surface 245 of rotor 234, which forms a truncated cone extending forward over shaft 212.

Friction disk 246, approximately in equal diameter to sloping friction surface 245, has one diagonal face 248 generally conforming to sloping friction surface 245 when friction disk 246 is arranged coaxially about axis 213 between rotor 234 and pulley 214. Friction disk 246 includes a central aperture to allow free rotation of shaft 212 and rotor 234 within friction disk 246 absent any radial compression of friction disk 246. In one embodiment, the friction disk is a single-piece ring split with a radial gap at one point. The radial gap allows for compression of the friction disk.

In a preferred embodiment, friction disk 246 is composed of a non-asbestos brake-lining material with a percentage of graphite. Graphite in friction disk 246 reduces friction, therefore the frictional links are lubricated. Further, graphite dust from friction disk wear acts as a general lubricant within clutch assembly 210. As a result, general wear is reduced and performance is enhanced. For example, graphite dust enhances the frictional coupling between helical spring 244 and pole face 242.

In another embodiment, friction disk 246 is three identical segments which form an arc. A three part structure of friction disk 246 alleviates premature and excessive wear of the friction disk from radial compression. Each segment defines a hollow at one end. Although several friction disks are disclosed, it will be recognized by those skilled in the art that many other variations exist for the configuration of friction disk 246 including, but not limited to, a two piece or four piece construction or any other construction that would function in this environment.

Figure 6:
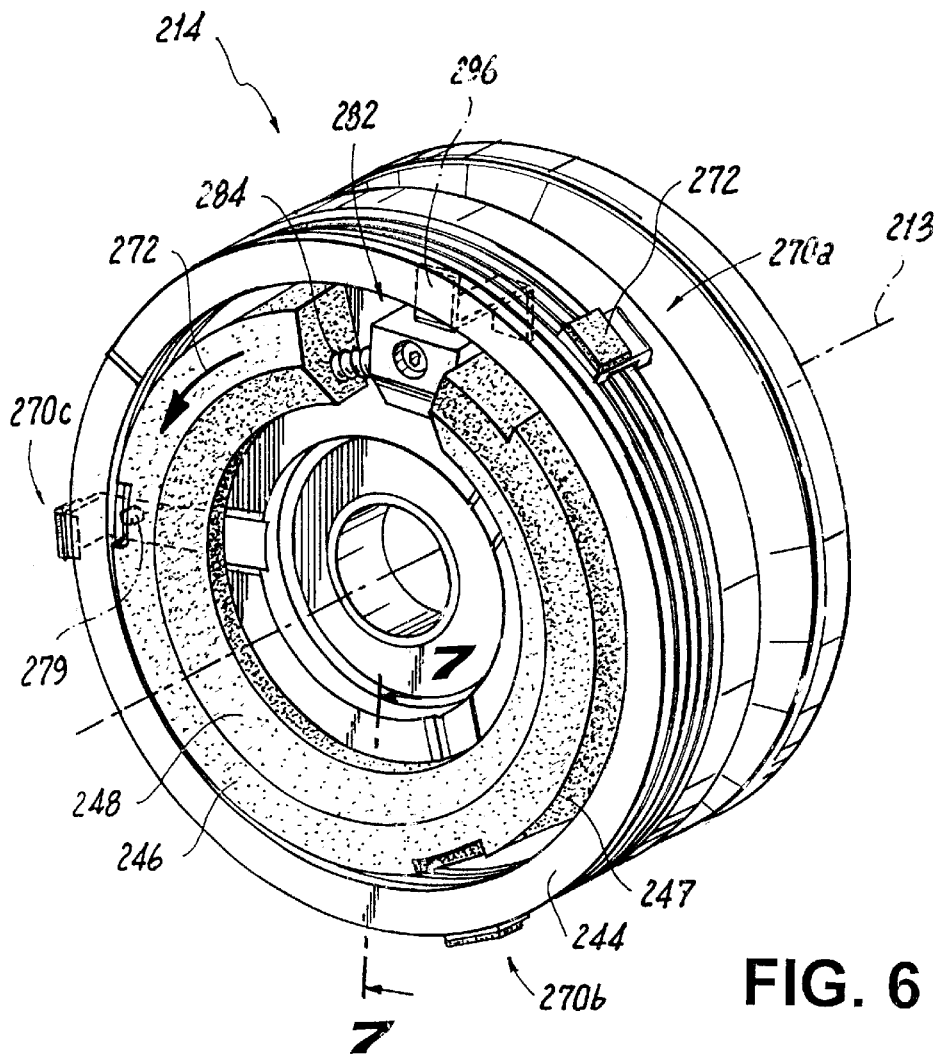
FIG. 6 is a perspective view of a pulley assembly with the friction disk and helical spring attached in an embodiment.
Figure 7:
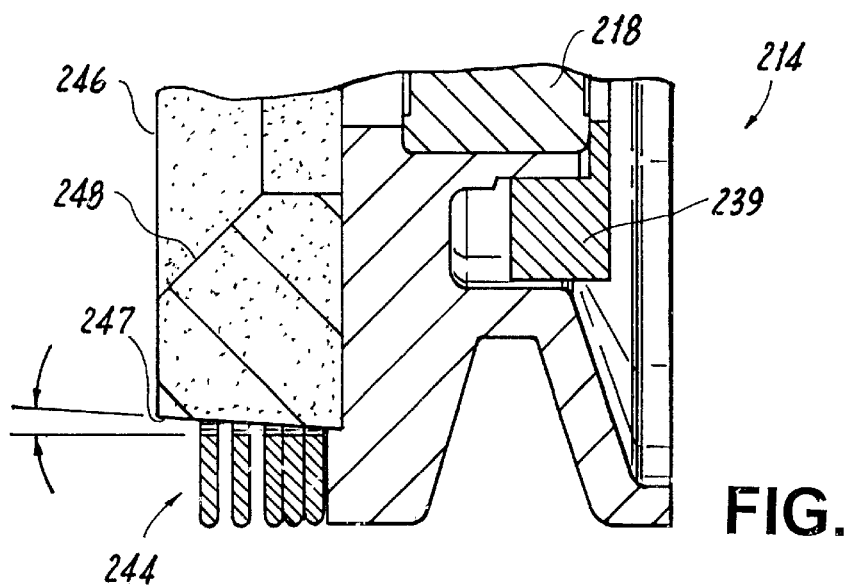
FIG. 7 is a partial cross-section of a pulley as assembled in FIG. 6.

Referring to FIGS. 6 and 7, a perspective view of pulley 214 and friction disk 246 assembled as well as a partial cross-section view of same are illustrated. Bumper block assembly 282 is located within the radial gap of friction disk 246 in order to control the rotation of the friction disk with respect thereto. Bumper block assembly 282 is fixed to pulley 214 in a well known manner. In a preferred embodiment, bumper block assembly 282 has a smaller profile than the friction disk 246 but defines the same cross-section profile. Therefore, no interference occurs as friction disk 246 compresses and decompresses. Bore 287 (see FIG. 8) in the bumper block assembly 282 receives compression spring 284. Compression spring 284 exerts a bias force as denoted by arrow 272 in FIG. 6 in order to rotate friction disk 246, when helical spring 244 is in a relaxed state. In a preferred embodiment, friction disc 246 is rotated approximately thirty degrees by bumper block assembly 282.

Alternatively, during wrap down of helical spring 244, friction disk 246 engages friction surface 245. The engagement generates a force to rotate friction disk 246 clockwise about axis 213 toward bumper block assembly 282. Momentarily, the bias of the compression spring 284 is overcome and friction disk 246 rotates towards bumper block assembly 282. Eventually, bumper block assembly 282 limits the rotational movement of friction disk 246.

Referring once again to FIG. 5(a) and FIG. 5(b), pulley 214 is assembled to clutch 210 by means of bearing 218 fitting over a front protruding support surface of the rotor 234. The inside of bearing 218 is supported on the support surface and the outside of bearing 218 fits within a bore in pulley 214, where plate 239 retains bearing 218. Cover 259 is held in place by screw 269 to prevent access of contaminants into clutch assembly 210. Radial face 250 of friction disc 246, opposed generally to diagonal face 248 of friction disk 246 but extending perpendicularly to axis 213, abuts a similarly extending friction surface 252 of pulley 214. Thus, a radial compression of friction disk 246 presses diagonal face 248 against friction surface 245. Upon such contact, friction disc 246 is forced along axis 213 until radial face 250 contacts friction surface 252 of pulley 214. At this point, diagonal face 248 frictionally engages friction surface 245 and radial face 250 frictionally engages frictions surface 252 and a frictional linking between rotor 234 and pulley 214 is established.

Referring to FIG. 5(c), FIG. 6, and FIG. 7, positioned coaxially about friction disk 246, on radial outward surface 247 and between upstanding axial pegs 279 and upstanding axial flanges 275 of brake shoe assemblies 270(a)–(c), is helical spring 244. Helical spring 244 has individual coils with a generally rectangular cross-section. Varying the thickness and width of the spring wire cross-section varies the speed of wrap down and energy required to wrap down helical spring 244. Pulley 214 has three radial slots 219(a)–(c) in friction surface 252. Three radial slots 219(a)–(c) slidably retain three brake shoe assemblies 270(a)–(c). Brake shoe assemblies 270(a)–(c) are coupled to pulley 214 by retainer plates 274(a)–(c), respectively. A pair of fasteners fix retainer plates 274(a)–(c) to pulley 214. In another embodiment, brake shoe assemblies 270(a)–(c) are retained by T-shaped slots cast in pulley 214. Preferably, pulley 214 is a zinc aluminum alloy. Therefore, the combination of the natural lubricity of zinc and the graphite dust from friction disk 246, which accumulates in radial slots 219(a)–(c), yields a smooth radial motion of brake shoe assemblies 270(a)–(c). Further, tight clearance between the retaining means and brake shoe assemblies 270(a)–(c) prevents tipping during movement. Tipping of brake shoe assemblies 270(a)–(c) is undesirable because unnecessary drag is created.

Brake shoe assemblies 270(a)–(c) preferably have a two-tiered rectangular portion which couples within the radial slots of pulley 214. When assembled, lower tier 276 is located under a retainer plate 274. The ability of helical spring 244 to wrap down determines the inward travel of brake shoe assemblies 270(a)–(c). Upper tier 278 has an upstanding axial peg 279 positioned near ridge 277 of brake shoe assemblies 270(a)–(c) and adjacent to the inner diameter of helical spring 244 when assembled. Additionally, upstanding axial peg 279 is integral with a hollow 249(a)–(c) within radial outward edge 247 of friction disk 246. Upper tier 278 also has an upstanding flange 275 on the radially outward end of brake shoe assemblies 270(a)–(c). The radial inner side of upstanding flange 275 is adjacent to the outer diameter of helical spring 244. The radial outer side of upstanding flange 275 has a brake pad 272. Preferably, brake pad 272 is composed of a friction material and adjacent to portion 224 of the outer tubular wall of field cup 222 when assembled.

Figure 9:
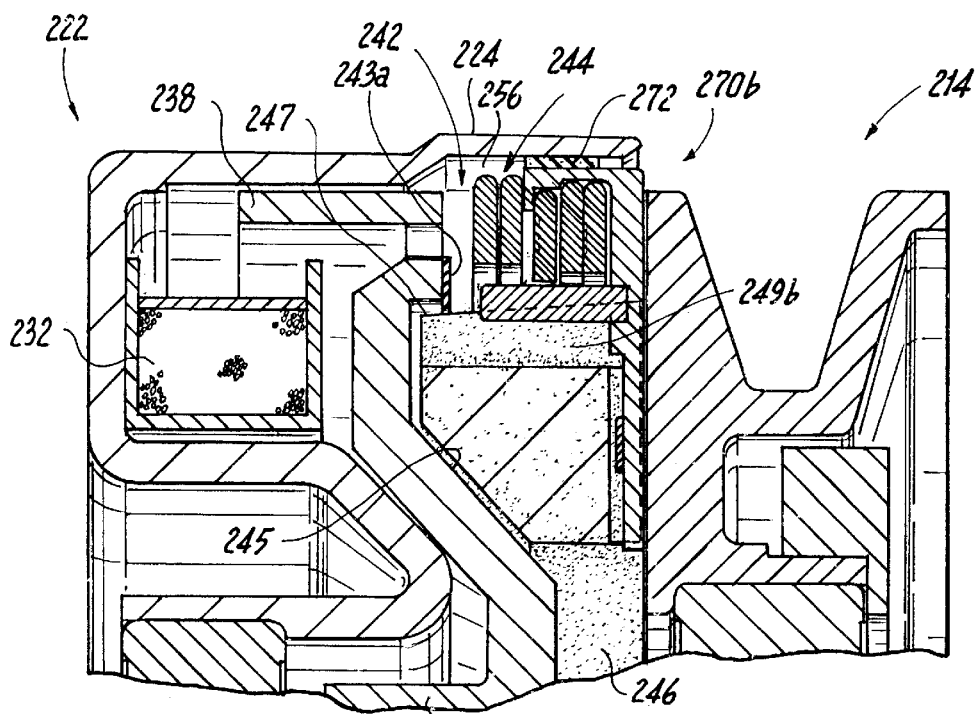
FIG. 9 is a cross-section fragmentary view of an assembled clutch assembly with the helical spring in a relaxed state.

In a preferred embodiment, brake shoe assemblies 270(a)–(c) brake shoe assemblies 270(b) and 270(c) are similarly configured. Upstanding flanges 275 on brake shoe assemblies 270(b) and 270(c) have a retaining lip 292. The retaining lips 292 bracket the three outer coils of helical spring 244. The retaining lips 292 allow inner coil 256 to move along axis 213 but retains the outer coils of helical spring 244. Brake shoe assembly 270(a) has no retaining lip. However, keeper 296 serves to retain helical spring 244 in that area. It is envisioned that the retaining lips can be integral to the pulley and brake shoe assemblies in various combinations. Each upstanding flange 275 has a stepped cross-section as illustrated in FIG. 5(c) and FIG. 9. The stepped cross-section insures proper clearance between upstanding flange 275 and helical spring 244. In a preferred embodiment, clearance between helical spring 244 and upstanding flanges 275 is five to ten thousandths of an inch before any wear occurs.

Referring now to FIG. 5(c), as helical spring 244 wraps down, the decreasing diameter presses on each upstanding axial peg 279 to move the brake shoe assemblies 270(a)–(c) radially inward. Hollows 249(a)–(c) of friction disk 246 surround upstanding axial pegs 279, respectively, to allow brake shoe assemblies 270(a)–(c) to move radially inward without interfering with friction disk 246. Thus, the inner radius of helical spring 244 wraps down directly on radial outward surface 247 of friction disk 246. The coils nearest pole face 242 decrease to a smaller diameter than the outer coils, however, it is desirable to have the inner profile of helical spring 244 uniformly wrap down on friction disk 246. A taper of radially outward edge 247, best illustrated FIG. 7, allows a uniform wrap down of helical spring 244 on friction disk 246. Consequently, outer profile of helical spring 244 is uneven or stepped. Upstanding axial flanges 275 of brake shoe assemblies 270(a)–(c) have an inner profile to match the uneven outer configuration of the helical spring when wrapped down. When helical spring 244 is in a relaxed state, the expanded diameter presses on the inner radial side of upstanding flanges 275 to move brake shoe assemblies 270(a)–(c) radially outward.

Referring to FIG. 5(c), outer coil 258 of helical spring 244 and pulley 214 each define bores for receiving pin 285. A keeper 296 prevents outer coil 258 from lifting off pin 285. Thus, pin 285 and keeper 296 function to insure coupling and retention of outer coil 258 of helical spring 244 to pulley 214. In the preferred embodiment, pin 285 is a roll pin which is press fit into pulley 214. A roll pin can be radially compressed, thus the need for a bore with a tight tolerance in pulley 214 is alleviated.

Figure 8:
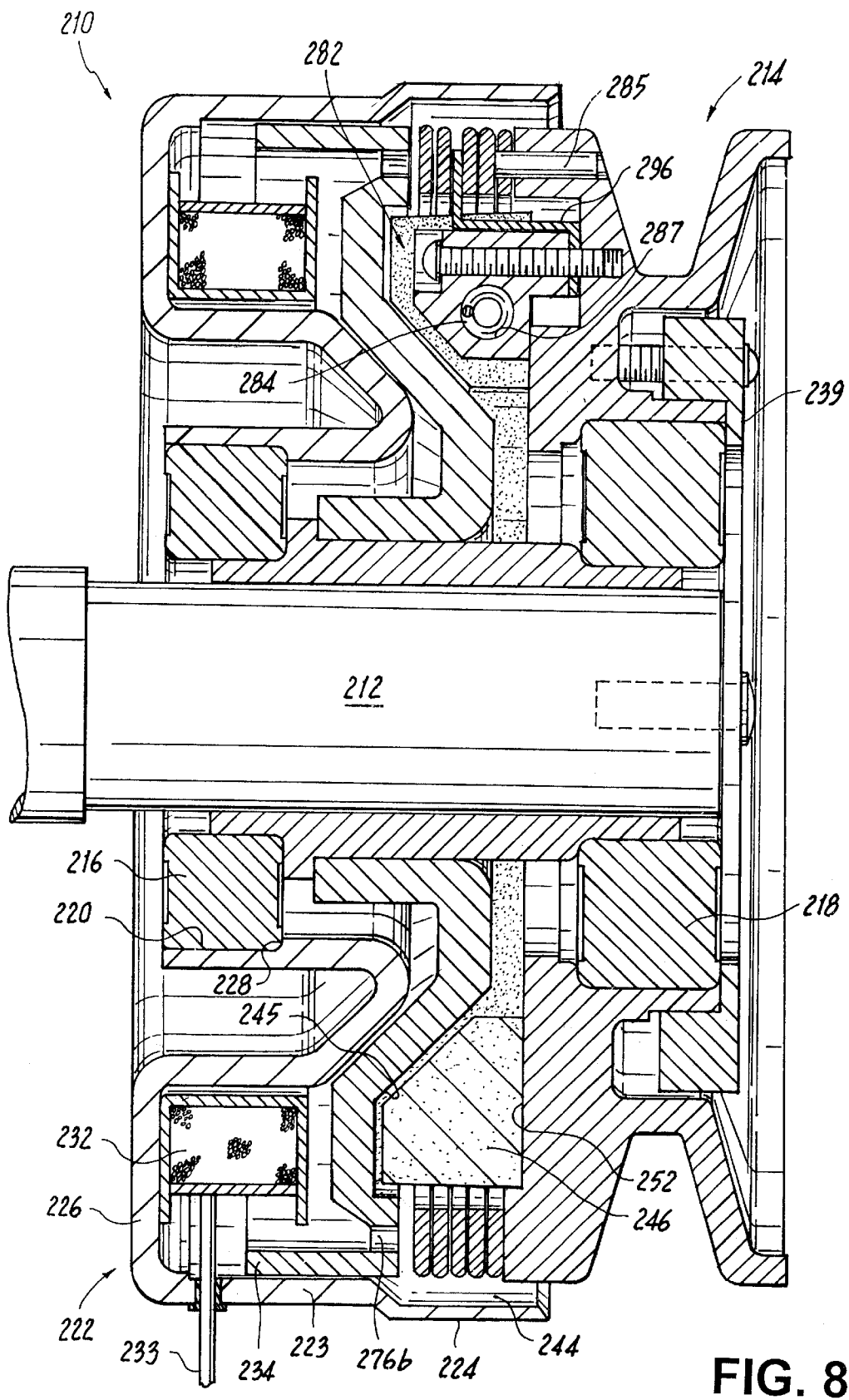
FIG. 8 is a perspective cross-section of a clutch assembly of an embodiment with the helical spring in the relaxed state.

Referring to FIG. 8, a perspective cross-section of a clutch assembly 210 with helical spring 244 in the relaxed state is illustrated. Bore 287 in bumper block assembly 282 receives compression spring 284. Pin 285 engages bores in helical spring 244 and pulley 214, respectively. Keeper 296 retains the outer coils of helical spring 244 against pin 285. Friction disk 246 has a radially outward edge 247 which is aligned opposing and abutting the radial inner edge of helical spring 244. In short, torsion of the helical spring causes a decrease in the effective diameter of the helical spring 244, i.e. wrap down. As a result, friction disk 246 contracts radially inward to wedge between friction surface 245 of rotor 234 and friction surface 252 of pulley 214. As a result, rotor 234 and pulley 214 are frictionally locked together as will be described in greater detail with respect to FIG. 10. Relaxation of the helical spring causes an increase in the effective diameter of the helical spring 244. As a result, brake shoe assemblies 270(a)–(c) are pressed against the outer tubular wall of filed cup 222 and pulley 214 is frictionally braked as will be described in greater detail with respect to FIG. 9.

Referring now to FIG. 9, a cross-sectional view of clutch assembly 210 with helical spring 244 in a relaxed state is illustrated. When electromagnetic coil 232 is de-energized, inner coil 256 is disengaged from pole face 242. The disengagement is a quick release because the retainer lips 292 of brake shoe assemblies 270(b) and 270(c) as well as keeper 296 retain the outer coils of helical spring 244 from extending to rotor 234. The quick release reduces wear, improves response time of brake engagement and reduces the possibility of undesirable drag.

Generally, helical spring 244 is sized so that when helical spring 244 is in a relaxed state, outer diameter of helical spring 244 is comparable to the inner diameter of portion 224 of field cup 222. Thus, the outer edge of helical spring 244 presses radially outward against upstanding flange 275 of each brake shoe assembly 270(a)–(c) pushing brake pads 272 against the inner radial edge of portion 224 effectively braking pulley 14 against field cup 222. Field cup 222 acts as a retention plate preventing motion of pulley 214. Although, helical spring 244 provides the energy, the brake force is transmitted from portion 224 of field cup 222 to brake pads 272 and in turn to pulley 214. It is envisioned that three brake shoe assemblies provide the necessary force to brake pulley 214. However, it is also envisioned that a different number and size brake shoe assemblies can be used to vary cycle life and performance of the disclosed system.

Figure 10:
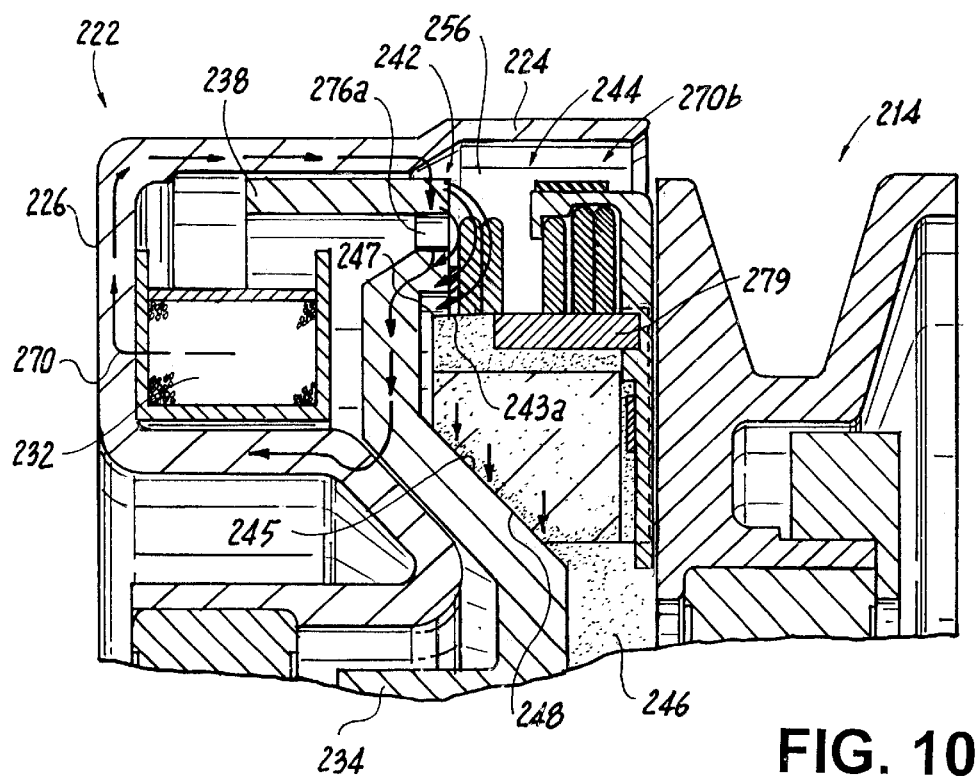
FIG. 10 is a cross-section fragmentary view of an assembled clutch assembly with the helical spring in a wrapped down state.

Referring now to FIG. 10, a cross-sectional view of clutch assembly 210 with helical spring 244 in a wrapped down state is illustrated. When electromagnet coil 232 is energized, magnetic flux 270 passes upward through base plate 226 and along the tubular outer wall of field cup 222 passing into annular cylindrical wall 238 of rotor 234 and then through inner coil 256 of the helical spring 244 which offers a lower resistance path than radial through slots 276(a)–(h). The magnetic flux then passes backward into the body of rotor 234 and then into the recess forming wall of the field cup 222 to complete its circuit. It is envisioned that field cup 222 has a tapered inner wall adjacent to the tapered surface of rotor 234 to increase the area, which results in an increase of the magnetic strength.

The magnetic flux attracts helical spring 244 towards rotor 234. The attraction of inner coil 256 of helical spring 244 causes inner coil 256 to extend against the frictional surfaces of the rotor 234. At this time, a frictional linking between the inner coil 256 and the friction surfaces of rotor 234 occurs. The turning of rotor 234 and the loading of shaft 212 is such as to tighten the windings of helical spring 244 causing its inner diameter to contract against each upstanding axial peg 279 of brake shoe assemblies 270(a)–(c). Brake shoe assemblies 270(a)–(c) slide radially inward releasing brake pads 272 from frictional linking against portion 224 of field cup 222. In a preferred embodiment, brake shoe assemblies 270(a)–(c) draw back approximately 30–40 thousandths of an inch from portion 224 of the tubular outer wall of fixed field cup 222. Additionally, the coupling of inner coil 256 of helical spring 244 to pole face 242 transfers torque directly to the pulley.

In a preferred embodiment, a strong magnetic coil, efficient frictional contact between inner coil 256 and pole face 242, radially sliding brake shoe assemblies 270(a)–(c) and keeper 296, both of which partially retain helical spring 244, as well as a wide cross-section of helical spring 244 combine to transfer significant torque to the pulley 214, yet also creates a soft engagement clutch at start up.

As helical spring 244 wraps down, the inner diameter of helical spring 244 radially compresses friction disk 246. In the preferred embodiment, the compressive force exerted by helical spring 244 on friction disk 246 is uniformly distributed. Specifically, the inner coils are under greater torsion and wrap down occurs more quickly upon the inner coils than the outer coils of helical spring 244. The outer surface 247 of friction disk 246 is tapered to allow the inner coils to wrap down further before contact with friction disk 246 occurs. As a result, all the coils of helical spring 244 wrap down on friction disk 246 at approximately the same time and the compressive force is uniformly distributed along the cross-section of the friction disk 246. It is envisioned that the taper of friction disk 246 can be modified, even reversed, to vary the performance characteristics of clutch assembly 210.

As friction disk 246 compresses, the diagonal surface 248 of friction disk 246 is forced against opposing diagonal friction surface 245 of rotor 234. This contact between friction disk 246 and rotor 234 causes friction disk 246 to rotate about axis 213 and against compression spring 284 housed in bumper block assembly 282. During the rotation, hollows 249(a)–(c) of the outside radial surface 247 of friction disk 246 need to be large enough to prevent interference with upstanding axial pegs 279 of brake shoe assemblies 270(a)–(c). As friction disk continues to compress, the diagonal shape of friction surface 245 pushes friction disk 246 in an axial direction until pulley 214 acts as a stop. Thus, friction between friction surface 245 on diagonal face 248 of friction disk 246 and friction between pulley 214 on radial face 250 of friction disk 246 causes pulley 214 to turn with rotor 234.

In an alternate preferred embodiment, helical spring 244 wraps down directly onto a friction surface of rotor 234. The frictional linking between helical spring 244 and rotor 234 transfers torque to pulley 214 to force pulley 214 to rotate. In another embodiment, a portion of pulley 214 could be sized similarly to the inner diameter of helical spring 244 so that helical spring 244 wraps down directly on pulley 214 alleviating stress on the helical spring mount and still effectively coupling rotor 234 and pulley 214 without a friction disk.

In another preferred embodiment, only a clutch is provided. In other words, no brake action occurs when the helical spring is in a relaxed mode, i.e. the coil is de-energized. To accomplish this, the helical spring is sized so that the outer diameter of the friction disk does not press the brake shoe assemblies against the tubular outer wall and no interference occurs. In another embodiment, the upstanding axial flanges are not required and thus no braking occurs. A lip to retain at least one coil of the helical spring can be attached to pulley 214 or bumper block assembly 282.

Figure 11:
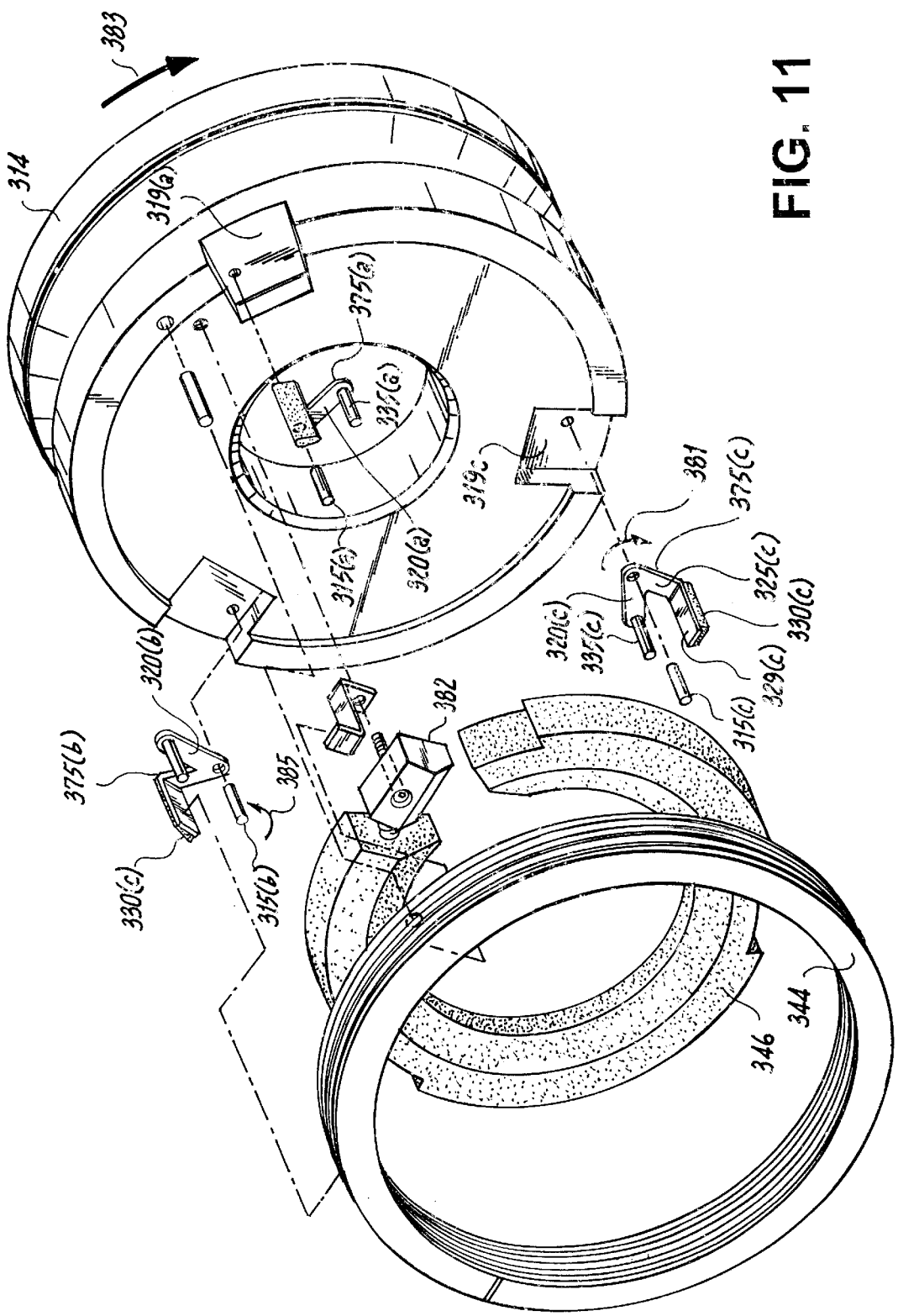
FIG. 11 is an exploded perspective view showing components of a pulley assembly of another embodiment.

Referring now to FIG. 11, an exploded perspective view showing components of pulley 314 assembly of another embodiment is illustrated. Three slots 319(a)–(c) in pulley 314 house three brake shoe assemblies 375(a)–(c). Brake shoe assemblies 375(a)–(c) are pivotally coupled to pulley 314 by pins 315(a)–(c). Preferably, pins 315(a)–(c) are head pins which are press fit into pulley 314. It is envisioned that pulley 314 is a zinc aluminum alloy. Therefore, the combination of the natural lubricity of zinc and the accumulated graphite dust from friction disk 346 yields a smooth motion of brake shoe assemblies 375(a)–(c). Brake shoe assemblies 375(a)–(c) have post struts 320(a)–(c) and flange struts 325(a)–(c) extending from pins 315(a)–(c), respectively. Flange struts 325(a)–(c) have upstanding flanges 329(a)–(c) with friction pads 330(a)–(c) adhered to the outermost radial surface, respectively, whereas post struts 320(a)–(c) have posts 335(a)–(c) upstanding upon the distal end thereof, respectively. Preferably, friction pads 330(a)–(c) are wedge-shaped. In another embodiment, at least one of the flange struts has a lip to retain at least a portion of helical spring 344. Additionally, pulley 314 has a bumper block assembly 382 similar to the one described with respect to FIGS. 6 and 7 above.

Figure 12:
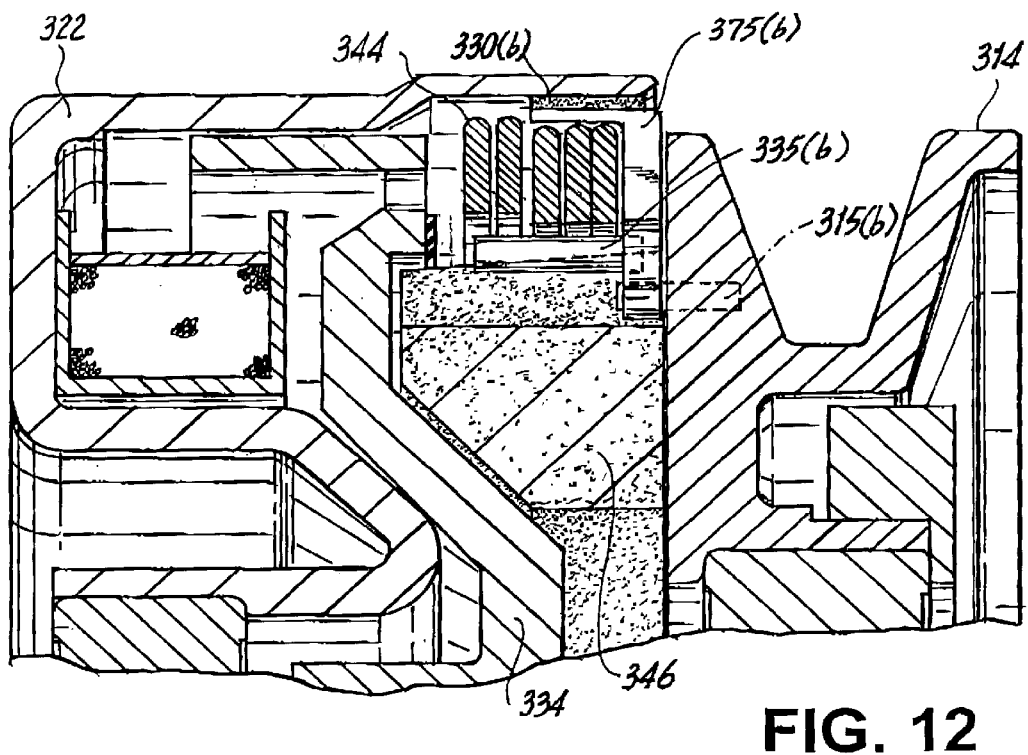
FIG. 12 is a cross-section fragmentary view of an assembled clutch assembly with the helical spring in a relaxed state.

Referring now to FIG. 12, a cross-section fragmentary view of another embodiment of a clutch assembly with helical spring 344 in a relaxed state, i.e. brake mode, is illustrated. When relaxed, helical spring 344 no longer urges posts 335(a)–(c) inward on pulley 314. However, after being clutched and before braking occurs, pulley 314 still spins in a clockwise direction indicated by arrow 383 in FIG. 11. The centrifugal forces, created by pulley 314 spinning, begin the process required to brake pulley 314. As a result of the centrifugal forces, brake shoe assemblies 375(a)–(c) pivot about pin 315 in a direction indicated by arrow 385 in FIG. 11. Thus, friction pads 330(a)–(c) contact field cup 322 to commence braking torque on pulley 314. The continued rotation of pulley 314 and wedge-shape of friction pads 330(a)–(c) interact to create even higher braking torque by further increasing the force upon brake shoe assemblies 375(a)–(c) in a direction along arrow 385. The braking torque is transmitted from field cup 322 to pulley 314 via pins 315(a)–(c). Thus, pulley 314 is stopped when helical spring 344 relaxes to allow brake assemblies 375(a)–(c) to rotate. In another embodiment, helical spring 344, when in a relaxed state, is sized and positioned to provide additional biasing of flanges 329(a)–(c) against field cup 322. It is envisioned that a single or a plurality of brake shoe assemblies can be mounted on pulley 314 to provide the desired performance.

Figure 13:
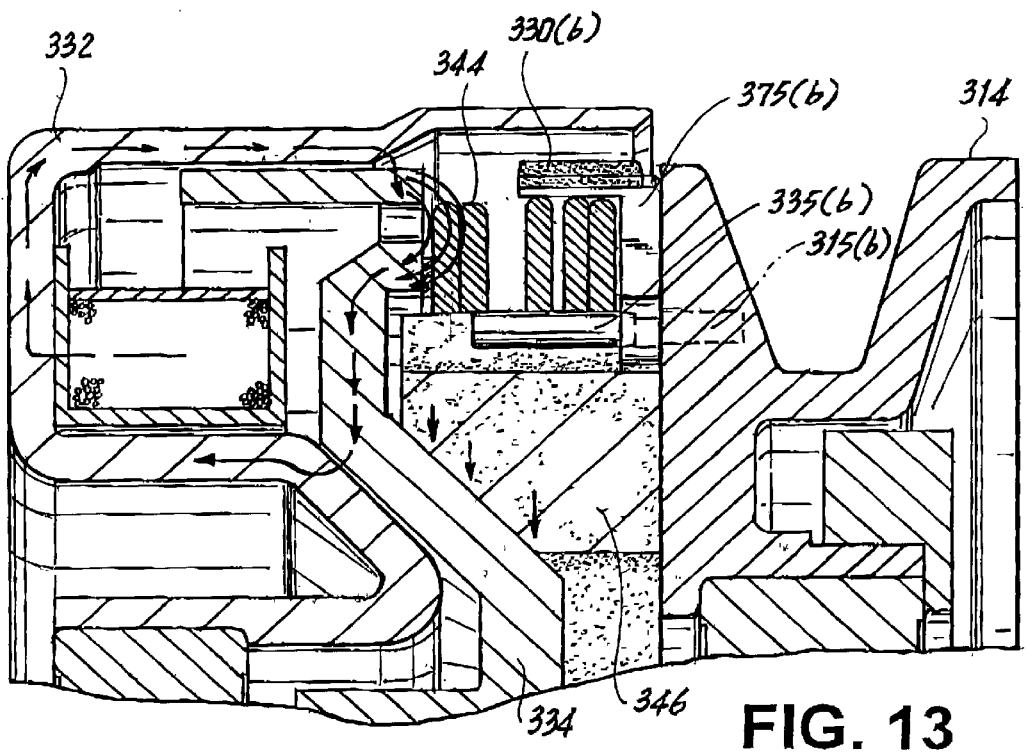
FIG. 13 is a cross-section fragmentary view of an assembled clutch assembly with the helical spring in a wrapped down state.

Referring now to FIG. 13, a cross-section fragmentary view of an assembled clutch assembly of another embodiment with helical spring 344 in a wrapped down state, i.e. clutch mode, is illustrated. When helical spring 344 is wrapped down, the inner diameter of helical spring 344 engages posts 335(a)–(c) to force brake assemblies 375(a)–(c) to rotate clockwise on pulley 314. As a result of the brake shoe assemblies 375(a)–(c) pivoting about pins 315(a)–(c), in a direction indicated by arrow 381 in FIG. 11, friction pads 330(a)–(c) move away from fixed field cup 322. Thus, pulley 314 is free to rotate when friction disk 346 frictionally links rotor 334 and pulley 314 together. Preferably, brake shoe assemblies 375(a)–(c) are partially recessed into pulley 314 to prevent undesirable interference with helical spring 344.

While the description above has been with respect to preferred embodiments, those skilled in the art will readily appreciate that various changes and/or modifications can be made without departing from the spirit or scope.

What is claimed is:

1. An electric clutch system comprising:
a fixed field cup having an electromagnetic coil;
a rotor mounted to rotate about an axis of rotation, wherein the rotor has a first friction surface and a pole face;
a pulley mounted to independently rotate about the axis, wherein the pulley has a second friction surface;
a discrete friction material secured to the pole face; and
a helical spring attached to the pulley, wherein the helical spring is sized and positioned such that when current flows through the electromagnetic coil, the helical spring is drawn to the pole face and frictionally linked therewith, wherein the friction material facilitates the helical spring frictionally linking to the pole face, causing the helical spring to wrap down creating a frictional linking between the first and second friction surfaces to act as a clutch between the rotor and pulley.

2. The system of claim 1, wherein the friction material is in a shape of an annular ring.

3. The system of claim 1, wherein the friction material is in a shape of three pads.

4. The system of claim 1, further comprising:
a friction disk having a rotor friction surface adjacent to the first friction surface and a pulley friction surface adjacent to the second friction surface.

5. The system of claim 4, wherein the friction disk has a tapered outer wall.

6. The system of claim 4, wherein the friction disk has a percentage of graphite.

7. The system of claim 4, wherein the friction disk is three substantially identical arcs which define a radial gap.

8. The system of claim 1, wherein the helical spring is sized and positioned such that when no current flows through the electromagnetic coil, the helical spring relaxes and causes a braking action on the fixed field cup to brake the pulley.

9. The system of claim 8, further comprising:
at least one brake element mounted on the pulley and disposed between the helical spring and the fixed field cup to facilitate the braking action on the fixed field cup.

10. The system of claim 9, wherein the at least one brake element serves to limit a portion of the helical spring from extending to the pole face when current flows through the electromagnetic coil.

11. The system of claim 9, wherein the pulley has at least one lip for retaining a portion of the helical spring from extending to the pole face when current flows.

12. The system of claim 9, wherein the at least one brake element is mounted to slide radially on the pulley and wherein the at least one brake element comprises:
a peg adjacent to the inner diameter of the helical spring; and
a flange adjacent to the outer diameter of the helical spring.

13. The system of claim 9, wherein the at least one brake element is mounted to pivot about a fixed point on the pulley and wherein the at least one brake element comprises:
a peg adjacent to the inner diameter of the helical spring; and
a flange, adjacent to the outer diameter of the helical spring.

14. An electric clutch assembly comprising:
a fixed field cup having a tubular outer wall and an electromagnetic coil;
a rotor mounted to rotate about an axis of rotation, wherein the rotor has a rotor friction surface and a pole face;
a pulley mounted to independently rotate, wherein the pulley has a pulley friction surface;
a friction disk having a first friction surface adjacent to the rotor friction surface and a second friction surface adjacent to the pulley friction surface;
a bias bumper, operatively connected to the pulley, for resetting the friction disk to a position; and
a helical spring attached to the pulley, wherein the helical spring has an inner diameter and an outer diameter, wherein the helical spring is sized and positioned such that when no current flows through the electromagnetic coil the bias bumper rotates the friction disk about the axis and when current flows through the electromagnetic coil the helical spring is drawn to the pole face resulting in the inner diameter wrapping down on the friction disk, compression of the bias bumper and a frictional linking between the first friction surface and the rotor friction surface as well as the second friction surface and the pulley friction surface to act as a clutch between the rotor and pulley.

15. The system of claim 14, wherein the bias bumper comprises a block defining a bore for receiving a spring.

16. The system of claim 15, wherein the block has a cross-section profile shaped similar to a cross-section profile of the friction disk.

17. The system of claim 14, wherein the rotor friction surface and the first friction surface are at an angle to the axis of rotation.

18. The system of claim 14, wherein the friction disk has a tapered outer wall.

19. The system of claim 14, wherein the bias bumper is mounted in a radial gap of the friction disk and has a lip for retaining a portion of the helical spring.

20. The system of claim 14, further comprising:
at least one bracket to retain a portion of the helical spring when current flows to the electromagnetic coil.

21. The system of claim 14, wherein the helical spring is sized and positioned such that when no current flows through the electromagnetic coil, the helical spring relaxes and the outer diameter causes a linking on the fixed field cup to brake the pulley.

22. The system of claim 14, further comprising:
at least one brake element disposed between the outer diameter of the helical spring and the tubular outer wall of the fixed field cup to facilitate the linking on the fixed field cup.

23. The system of claim 22, wherein the at least one brake element serves to limit a portion of the helical spring from extending to the pole face when current flows through the electromagnetic coil.

24. The system of claim 22, wherein the at least one brake element comprises: a peg adjacent to the inner diameter of the helical spring; and a flange adjacent to the outer diameter of the helical spring.

25. The system of claim 24, wherein the friction disk defines a hollow to avoid interference with the peg.

26. The system of claim 25, wherein, when current flows through the electromagnetic coil, the inner diameter forces the peg radially inward.

27. The system of claim 14, wherein the fixed field cup is sized to contain the rotor, the helical spring and a portion of the pulley.

28. The system of claim 14, further comprising:
a friction material between the pole face and helical spring for coupling the helical spring to the pole face.

29. An electric clutch assembly comprising:
a fixed field cup having an electromagnetic coil;
a rotor mounted to rotate about an axis of rotation, wherein the rotor has a rotor friction surface and a pole face;
a pulley mounted to independently rotate, wherein the pulley has a pulley friction surface;
a helical spring operatively connected to the pulley, the helical spring having multiple windings;
at least one assembly operatively connected to the pulley for axially retaining at least one of the multiple windings of the helical spring; and
wherein the helical spring is sized and positioned such that when current flows through the electromagnetic coil the at least one assembly allows a portion of the helical spring to extend to the pole face causing a wrapping down of the helical spring and a frictional linking between the rotor friction surface and the pulley frictions surface to act as a clutch between the rotor and pulley.

30. The system of claim 29, wherein the at least one assembly comprises:

a peg adjacent to the inner diameter of the helical spring; and a flange adjacent to the outer diameter of the helical spring.

31. The system of claim 30, wherein the flange has a stepped cross-section.

32. The system of claim 30, wherein the at least one assembly is mounted to slide radially when the helical spring wraps down and relaxes.

33. The system of claim 30, wherein the at least one assembly is mounted to pivot about a fixed point when the helical spring wraps down and relaxes.

34. The system of claim 30, wherein the helical spring is sized and positioned such that when no current flows through the electromagnetic coil, the helical spring relaxes and causes a frictional linking on the fixed field cup to brake the pulley.

35. The system of claim 34, wherein, when the helical spring relaxes, the helical spring pushes the flange and a brake pad on the flange frictionally links against the field cup to brake the pulley.

36. The system of claim 34, wherein, when the helical spring wraps down, the helical spring pushes the peg to release the pulley.

37. The system of claim 29, wherein the at least one assembly comprises at least three assemblies.

38. The system of claim 37, wherein at least two assemblies of the at least three assemblies retain a portion of the helical spring.

39. The system of claim 29, further comprising:

a friction disk having a first friction surface adjacent to the rotor friction surface and a second friction surface adjacent to the pulley friction surface.

40. The system of claim 39, further comprising:

a bias bumper attached to the pulley, wherein when no current flows through the electromagnetic coil, the bias bumper rotates the friction disk.

41. The system of claim 29, wherein the pulley is composed of a zinc aluminum alloy.

42. An electric clutch method comprising the steps of:

providing an electromagnetic coil within a fixed field cup to create a magnetic flux when energized;

providing an independently rotatable rotor having a pole face having a discrete friction material mounted on the pole face, wherein the friction material is adjacent to the electromagnetic coil; and providing a helical spring operatively connected to an independently rotatable pulley, wherein when the electromagnetic coil is energized, the helical spring extends to the pole face and a friction linking occurs between the friction material and the helical spring sufficiently to wrap down at least one coil of the helical spring adjacent to the pole face to create a frictional linking between the independently rotatable pulley and the independently rotatable rotor.

* * * * *